UNITED STATES PATENT OFFICE.

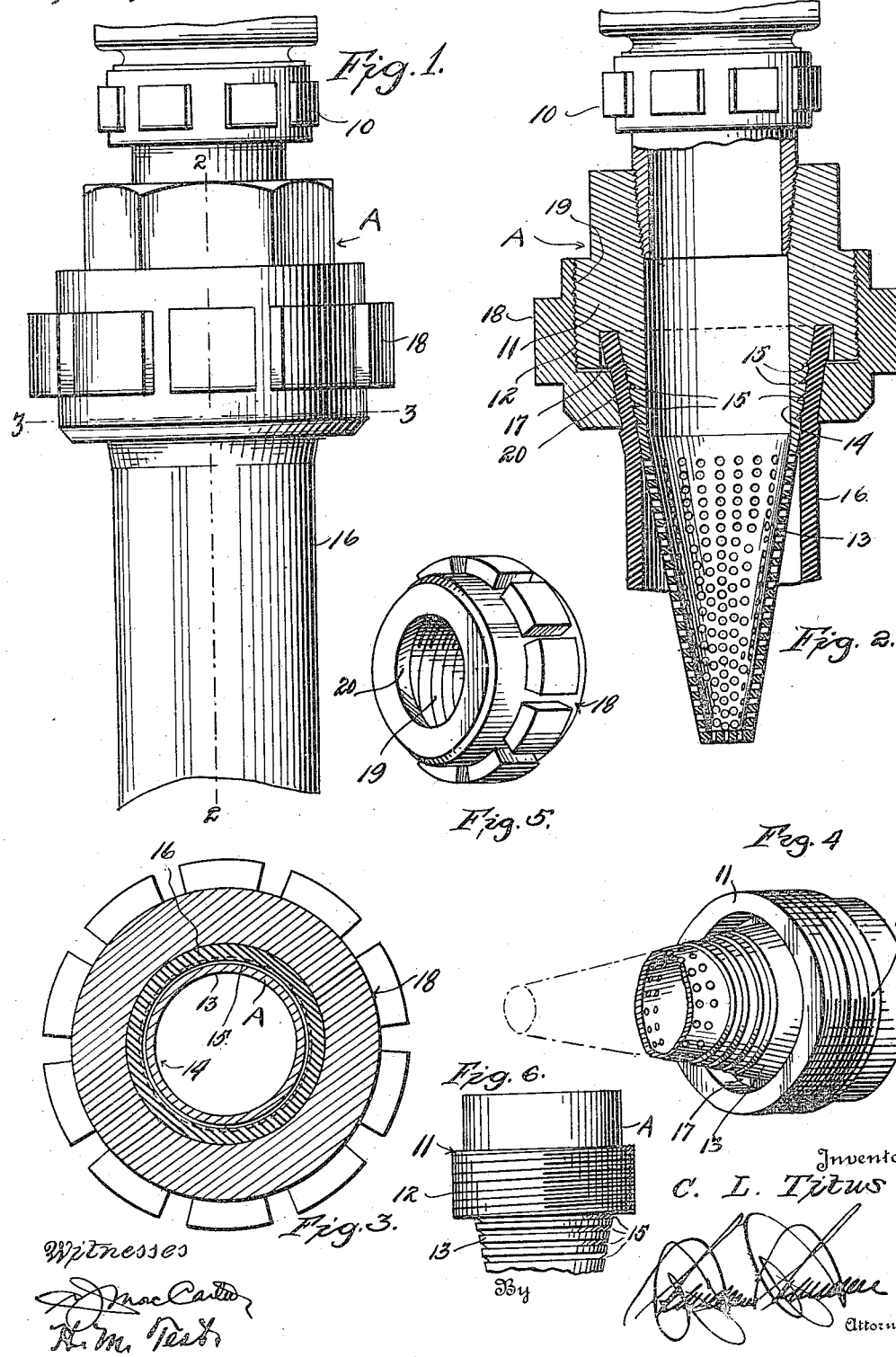

CLAUD L. TITUS, OF NYMORE, MINNESOTA, ASSIGNOR OF ONE-FOURTH TO JOHN W. SMITH AND ONE-FOURTH TO HARRY E. TITUS, BOTH OF BEMIDJI, MINNESOTA.

ATTACHMENT FOR FEED-WATER INJECTORS.

1,265,402. Specification of Letters Patent. Patented May 7, 1918.

Application filed April 14, 1916. Serial No. 91,195.

*To all whom it may concern:*

Be it known that I, CLAUD L. TITUS, a citizen of the United States, residing at Nymore, in the county of Beltrami, State of Minnesota, have invented certain new and useful Improvements in Attachments for Feed-Water Injectors; and I do hereby declare the following to be a full, clear, and exact description of the invention, such as will enable others skilled in the art to which it appertains to make and use the same.

This invention relates to improvements in pipe couplings and is directed more particularly to a coupling adapted for employment in connection with feed water injectors for steam boilers.

An object of the present invention resides in the provision of a coupling of the character specified, which embodies in its construction a strainer formed integral with one element thereof and adapted for employment in lieu of the separable strainer commonly employed in this connection.

Another object is to provide a device of this character which obviates the use of the usual clamping rings which are placed around the hose to hold the same in leakproof engagement with the strainer.

Other objects and advantages will be apparent from the following description when taken in connection with the accompanying drawing.

In the drawing:

Figure 1 is an elevation of my improved hose connecting device shown in connection with the suction portion of an injector.

Fig. 2 is an enlarged vertical section on the line 2—2 of Fig. 1.

Fig. 3 is a transverse section on the line 3—3 of Fig. 1.

Fig. 4 is a perspective view of the strainer removed.

Fig. 5 is a perspective view of the nut.

Fig. 6 is a fragmentary elevation of the member A.

Referring particularly to the accompanying drawing, 10 represents the suction member of the feed water injector. To this member is detachably secured an integrally cast member represented as a whole by the reference character A. This member comprises a body portion 11 formed with the external threads 12 and the integral tapering hollow strainer member 13. There is a bore 14 formed through this body 11 which communicates with the larger end of the strainer. The peripheral face of the larger end of the strainer is formed with a plurality of circumferentially extending ribs 15 which bite into the interior wall of the hose 16 when the end of said hose is engaged around the strainer. On the strainer side of the body 11 is formed a circular channel 17, into which the end of the hose is adapted to be seated when engaged on the strainer. A nut 18 is provided, said nut having a straight threaded bore portion 19 and an inclined plane or smooth bore portion 20, the former of which engages with the threaded face 12 of the body 11 while the inclined portion bears against the external face of the hose outwardly of the ribs 15 so as to firmly press the hose against the ribs and also hold the adjacent end of the hose within the channel 17. Attention is particularly directed to the fact that the body 11 and the strainer member 13 are formed of a single piece and that the nut is applied by first placing the same on the hose, after which the strainer is inserted within the hose and then the nut engaged with the threaded face of the body 11. With this construction, the hose can be more quickly and easily attached to or removed from the suction end of the injector than with devices of similar character now in use.

While I have illustrated and described the preferred embodiment of the invention, it is to be understood that the same may be employed as a coupling in connection with fire, air, garden hose and the like, without departing from, or sacrificing the merits of the invention as defined in the appended claim.

What I claim is:—

A fitting for hose and the like consisting of a coupling body having a bore therethrough and provided at one end with a pipe attaching means, a tubular closed extension formed on the opposite end of the body by a continuation of the metal thereof immediately adjacent the hose, said extension continuing said bore for a distance and there being reduced and perforated at its end to provide a strainer, a beveled seat formed upon the outer face of the extension adjacent the body and the latter having an annular recess formed therein to extend said seat, and a coupling nut threaded on the body and having an inwardly directed flange to coöperate with said beveled seat to clamp a hose end therebetween.

In testimony whereof, I affix my signature, in the presence of two witnesses.

CLAUD L. TITUS.

Witnesses:
WM. C. TITUS,
F. T. SMITH.